Oct. 31, 1967 R. K. McKIBBEN 3,349,456
CLAMP BAND TENSIONING DEVICE
Filed Jan. 28, 1966
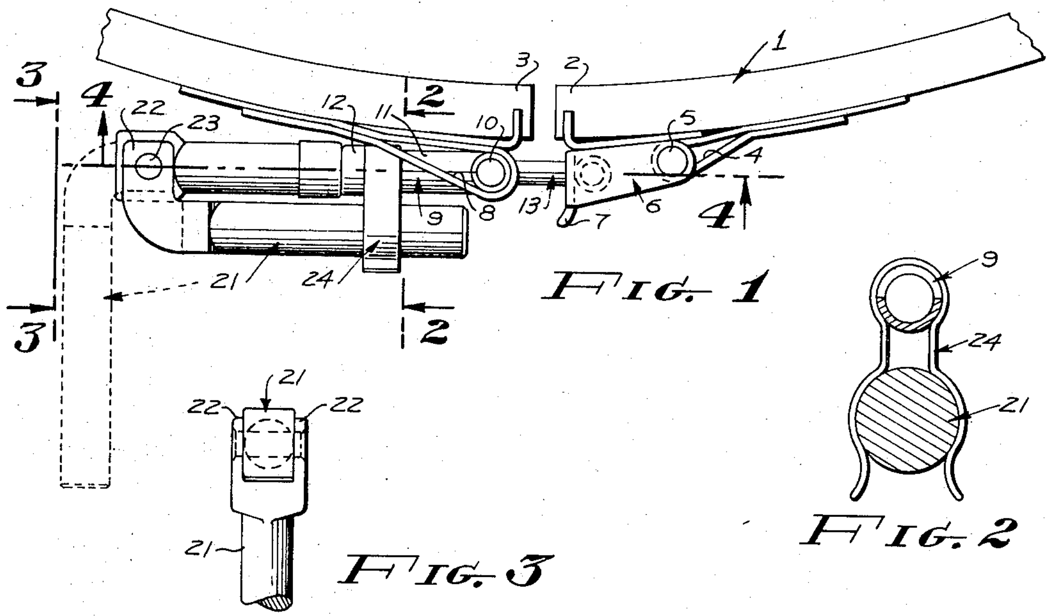
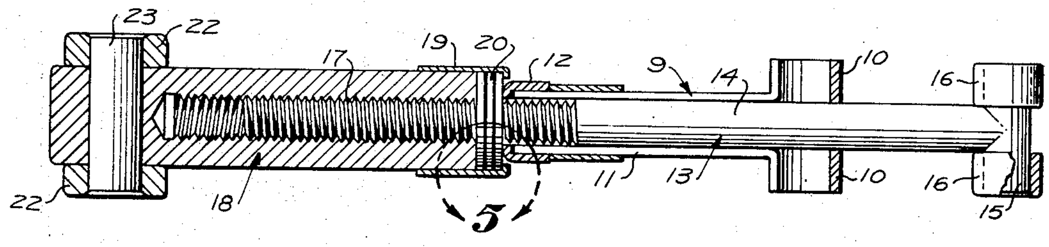
FIG. 4
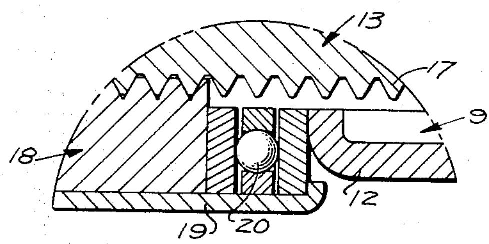
FIG. 5
RICHARD K. McKIBBEN
INVENTOR.
BY Lyon & Lyon
ATTORNEYS

United States Patent Office 3,349,456

Patented Oct. 31, 1967

3,349,456

CLAMP BAND TENSIONING DEVICE

Richard K. McKibben, La Canada, Calif., assignor to Southwestern Engineering Company, Los Angeles, Calif., a corporation of California Filed Jan. 28, 1966, Ser. No. 536,231

4 Claims. (Cl. 24—279)

ABSTRACT OF THE DISCLOSURE

A split clamp band having extremities occupying confronting relations and bearing units adjacent to the extremities, a keeper journaled in one bearing unit and a sleeve journaled in the other bearing unit, the clamp band having a tensioning device including slidable bolt in the sleeve which is engageable with the keeper, an elongated nut screwthreaded on the bolt which is engageable with the sleeve and a handle which is connected to the nut so as to pivot and which is movable between an angular operable position for turning the nut and a storage position alongside the nut.

This invention relates to clamp band tensioning devices and included in the objects of this invention are:

First, to provide a clamp ring tensioning device which forms a permanent part of the clamp band tensioning structure, and is readily operable whenever needed to tighten or loosen a clamp band without the use of extraneous tools.

Second, to provide a clamp band tensioning device which requires less torquing than a tensioning device using the conventional nut-on-bolt.

Third, to provide a clamp band tensioning device which occupies, when the clamp ring is in use, a compact folded position from which it may be extended to function as a wrench for removing or further tensioning the clamp band.

Fourth, to provide a tensioning device which is particularly adapted for incorporation in the type of clamp band shown in Patent No. 2,368,929, issued Feb. 6, 1945, for Quick Coupling Clamp.

With the above and other objects in view as may appear hereinafter, reference is directed to the accompanying drawings, in which:

FIGURE 1 is a fragmentary view of a clamp band incorporating the tensioning device, the tensioning device being shown by solid lines in storage position and by dotted lines in its operating position.

FIGURE 2 is a second view of the tensioning device taken through 2—2 of FIGURE 1.

FIGURE 3 is a fragmentary end view of the tensioning device shown in its operating position.

FIGURE 4 is an enlarged longitudinal sectional view of the tensioning device taken through 4—4 of FIGURE 1.

FIGURE 5 is an enlarged, fragmentary sectional view thereof taken within circle 5 of FIGURE 4.

The tensioning device is adapted to be incorporated in a clamp band 1 which may be flat, U-shaped or otherwise contoured in cross section to conform to the object which is to be clamped.

The clamp band is split forming confronting ends 2 and 3. Near the confronting end 2, there is formed a loop 4 of strap metal which forms a bearing adapted to to receive a journal pin 5 to which is attached a keeper 6. The keeper includes an end wall 7 having a slot therein, not shown.

The other confronting end 3 of the clamp band is provided with a second loop 8 formed of strap metal. The loop 8 is divided into axially displaced sections which form bearings. A tubular T-fitting 9 is provided having laterally extending tubular journals 10 which fit in the bearings formed by the split loop 8.

The T-fitting also forms a sleeve 11. A cap or ferrule 12 fits over the extended end of the sleeve.

The construction thus far described is in many respects similar to the construction more fully disclosed in the aforementioned patent.

A T-bolt 13 is provided which includes a shank 14 and transversely extending journals 15, preferably provided with journal sleeves 16. The shank adjacent the journal pin 5 is adapted to fit in the slot provided in the end wall 7 of the keeper 6 so that the journal sleeves 16 bear against the end wall.

The shank is provided with an elongated screwthreaded portion 17 which is received in a elongated socket nut 18. The open end of the socket nut is provided with a ferrule 19 having an inturned flange. The ferrule 19 retains a thrust bearing 20 overlying the open end of the socket nut.

The thrust bearing is adapted to engage the cap or ferrule 12 carried by the sleeve 11 of the tubular T-fitting 9.

A lever handle 21 is provided in the form of a shaft having an offset bifurcated end 22 which straddles the closed end of the socket nut 18 and is pivotally connected thereto by a cross pin 23. The lever handle is movable between a storage position alongside the socket nut 18 and sleeve 11 and an operating position at right angles thereto as indicated by dotted lines in FIGURE 1 or any suitable intermediate angle.

The sleeve 11 is provided with a clip 24 which is adapted to retain the lever handle 21 in its storage position as shown in FIGURE 1.

Operation of the clamp band tensioning device is as follows:

When the clamp band is free, the T-fitting 9 is pivotal about the bearings formed by the loop 8 so that the T-bolt 13 may be pivoted into or out of the keeper 6. When the T-bolt is engaged in the keeper 6, the clamp band may be tensioned by moving the lever handle 21 to the dotted line position shown in FIGURE 1 or any suitable intermediate position so that the socket nut 18 may be screwed onto the T-bolt 13 while the thrust bearing 20 bears against the end of the tubular T-fitting 9.

It should be noted that by use of an elongated nut with a large number of active screwthreads, and by use of the thrust bearing 20, the torque required to turn the socket nut 18 is greatly reduced and galling is eliminated.

When the clamping band has been properly tensioned, the handle lever is folded to its storage position. To release the clamp band, the handle lever is released from its storage position and rotated to unscrew the socket nut 18 from the T-bolt 13.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. The combination with a split clamp band having extremities occupying a confronting relation, bearing units adjacent said extremities, a keeper journalled in one bearing unit and a sleeve journalled in the other bearing unit, of a tensioning device comprising:

(a) a bolt slidable in said sleeve and engageable with said keeper;

(b) an elongated nut screwthreaded on said bolt and engageable with said sleeve;

(c) and a handle pivotally connected to said nut and movable between an angular operable position for turning said nut and a storage position alongside said nut;

(d) and means for releasably retaining said handle in its storage position.

2. The combination with a split clamp band having extremities occupying a confronting relation, bearing units adjacent said extremities, a keeper journalled in one bearing unit and a sleeve journalled in the other bearing unit, of a tensioning device comprising:

(a) a bolt slidable in said sleeve and engageable with said keeper;

(b) an elongated nut screwthreaded on said bolt;

(c) a thrust bearing interposed between said nut and said sleeve;

(d) and a handle pivotally connected to said nut and movable between an angular operable position for turning said nut and a storage position alongside said nut;

(e) and means for releasably retaining said handle in its storage position.

3. A clamp band comprising:

(a) a split band member;

(b) a keeper at one end thereof;

(c) a bearing means at the confronting other end of said band member;

(d) a sleeve having transversely disposed journals fitting said bearing means, said sleeve defining an axis directed toward said keeper;

(e) a bolt having an enlarged end releasably engageable with said keeper;

(f) an elongated nut having a screwthreaded socket receiving said bolt and bearing against said sleeve for drawing the ends of said band together when said bolt head is engaged in said keeper;

(g) and an handle pivotally connected to said nut and movable between an angular operable position for turning said nut and a storage position alongside said nut;

(h) and means for releasably retaining said handle in its storage posiiton.

4. A clamp band comprising:

(a) a split band member;

(b) a keeper at one end thereof;

(c) a bearing means at the confronting other end of said band member;

(d) a sleeve having transversely disposed journals fitting said bearing means, said sleeve defining said axis directed toward said keeper;

(e) a bolt having an enlarged end releasably engageable with said keeper;

(f) an elongated nut having a screwthreaded socket receiving said bolt and bearing against said sleeve for drawing the ends of said band together when said bolt head is engaged in said keeper;

(g) a thrust bearing interposed between said nut and sleeve;

(h) a handle pivotally connected to said nut and movable between an angular operable position for turning said nut and a storage position alongside said nut;

(i) and means for releasably retaining said handle in its stored position.

References Cited

UNITED STATES PATENTS

| | | | |
|---|---|---|---|
| 244,309 | 7/1881 | Rhodes. | |
| 556,755 | 3/1896 | Kelly. | |
| 648,361 | 4/1900 | Sheahan. | |
| 2,283,179 | 5/1942 | Buckingham | 85—32 |
| 2,874,438 | 2/1959 | Skelly | 24—279 |
| 2,893,097 | 7/1959 | Hill et al. | 24—279 |
| 2,941,273 | 6/1960 | Skelly | 24—279 |

JAMES L. JONES, Jr., *Primary Examiner.*